Apr. 3, 1923.  
F. P. WOOD  
MOISTUREPROOF CONTAINER BODY  
Filed Apr. 18, 1919  
1,450,476
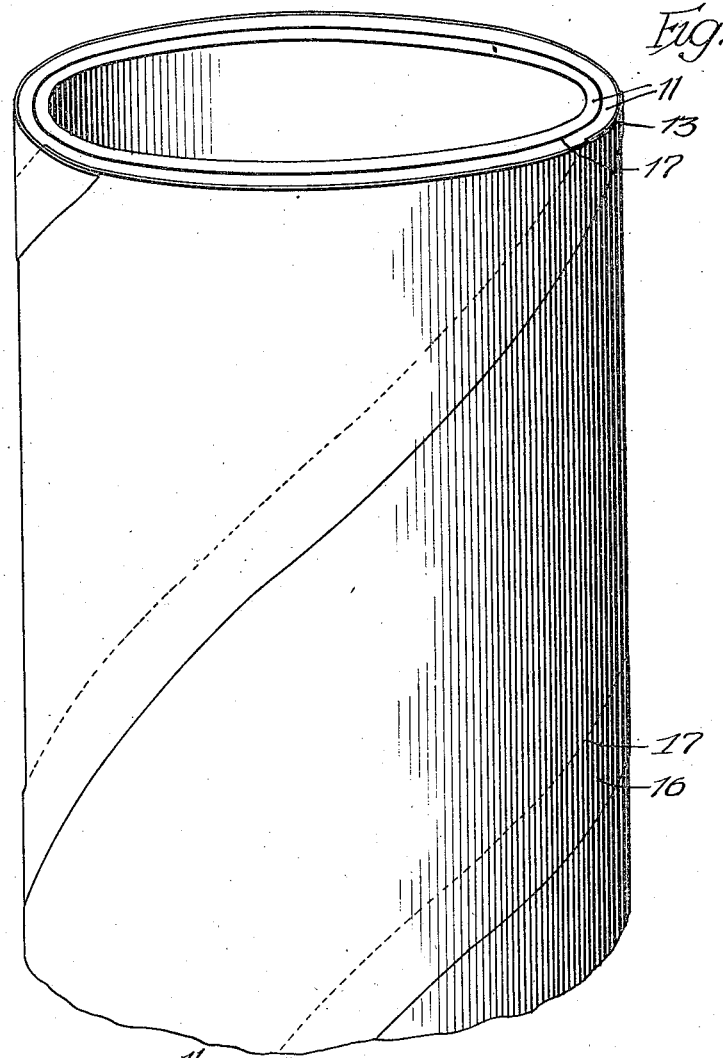
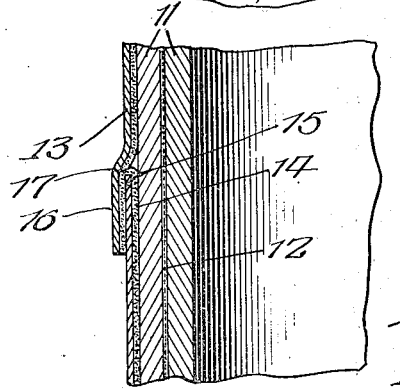
Inventor  
Frederick P. Wood  
By Munday, Clarke  
& Carpenter Attys.

Patented Apr. 3, 1923.

1,450,476

UNITED STATES PATENT OFFICE.

FREDERICK P. WOOD, OF NEW YORK, N. Y., ASSIGNOR TO AMERICAN CAN COMPANY, OF NEW YORK, N. Y., A CORPORATION OF NEW JERSEY.

MOISTUREPROOF CONTAINER BODY.

Application filed April 18, 1919. Serial No. 290,927.

*To all whom it may concern:*

Be it known that I, FREDERICK P. WOOD, a citizen of the United States, residing in New York, in the county of New York and State of New York, have invented a new and useful Improvement in Moistureproof Container Body, of which the following is a specification.

This invention relates in general to moisture-proof containers and has more particular reference to moisture-proof containers of fibrous material consisting of two or more layers of paper or fibre board connected together with a fused cement.

The particular object of this invention is the provision of a container or container body of this character wherein the film or layer of fused cement will be continuous and extend across and protect the adjoining edges of the fibre material forming the body so that opportunity for the entrance of moisture between edges of the material is eliminated.

Another object of the invention is the provision of a completely moisture-proof body which may be made upon a spiral winder.

The invention has also in contemplation a process for constructing a fibre body in such manner that the plies of it will be connected by a fused cement extending in a continuous film and past the adjoining edges to the plies of fibrous material which being provided in sheet form must be either wrapped, folded or wound to form the body thus providing edges which in the finished structure closely adjoin each other.

Numerous other objects and advantages of the invention will be apparent as it is better understood from the following description when considered in connection with the accompanying drawings which illustrate a present preferred embodiment of my invention.

Referring to the drawings,

Figure 1 is a perspective view of a container body embodying my present invention, and Fig. 2 is a partial enlarged view through the same showing certain features of construction.

For the purpose of illustrating my present invention I have shown on the drawing a carcass composed of two plies 11 of fibre board or paper connected together by any suitable material 12, glue being sufficient in the present instance. Upon this carcass is provided an outer ply or layer of board 13 which is connected to the carcass by a film or layer 14 of fused cement, asphaltum being excellent for the purpose. The outer ply is in the form of a sheet and when disposed about the carcass of course provides adjoining edges through which it is desired to prevent leakage of moisture. This I accomplish by providing a continuous film of the fused cement this film extending throughout the length and completely around the body. This film is preferably provided upon the back or one side of the sheet 13 and this sheet is then wound about the carcass. The edges of the sheet are caused to overlap in the winding as indicated in the drawing and in order that the film may be continuous pressure is applied to cause the fused cement to exude out from beneath the undermost end 15 and into contact with the film of fused cement between the superposed outer edge 16, as indicated at 17, thus connecting these adjoining edges of the fused cement to provide a continuous film.

It is thought that the invention and many of its attendant advantages will be understood from the foregoing description, and it will be apparent that various changes may be made in the form, construction and arrangement of the parts without departing from the spirit and scope of the invention defined in the claims or sacrificing any of its material advantages, the form hereinbefore described being merely a preferred embodiment thereof.

I claim:

A moisture-proof container comprising an inner carcass of fibrous paper-like material, an outer spiral sheet the main portion of the width of which is wound on said carcass and the margins of which extend parallel with said carcass and with each other and are overlapped, and a continuous layer of fused cement compressed between said carcass and outer sheet, said fused cement also extending continuously between the lapped portions of said outer sheet in an interrupted layer exterior to said continuous layer, so as to make the vertical wall of the container impervious throughout.

Signed in the presence of two subscribing witnesses.

FREDERICK P. WOOD.

Witnesses:
D. F. MENNIS,
J. DREYFUSS.